Dec. 30, 1958  A. L. HOUGHTALING  2,866,357
SAFETY GUARDS FOR STEERING WHEELS IN MOTOR VEHICLES
Filed Dec. 28, 1955
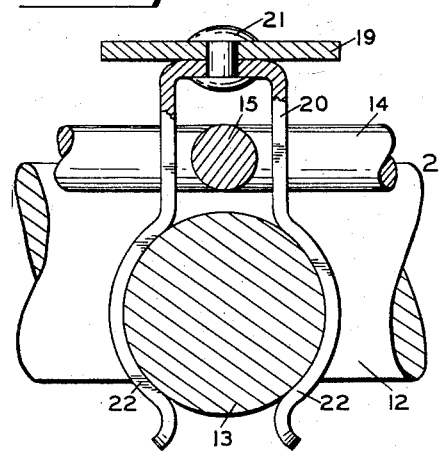
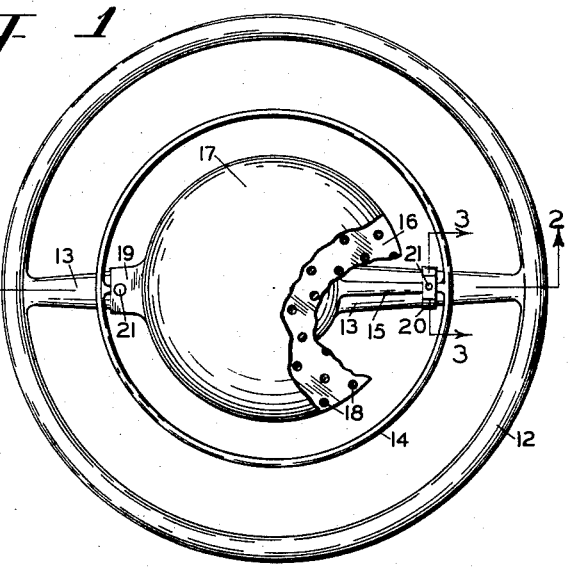
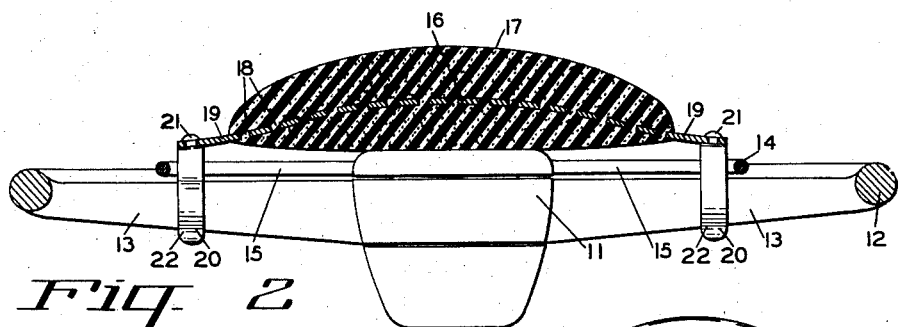
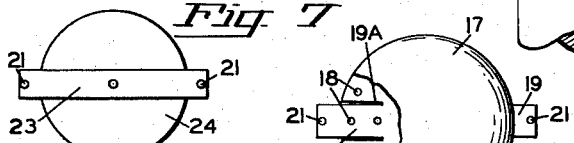
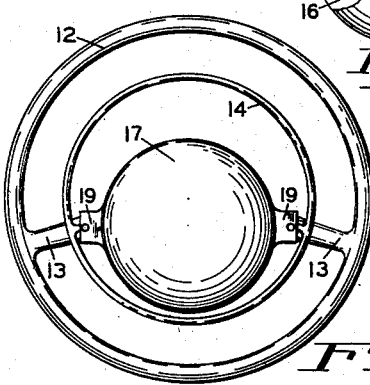
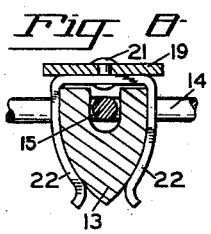
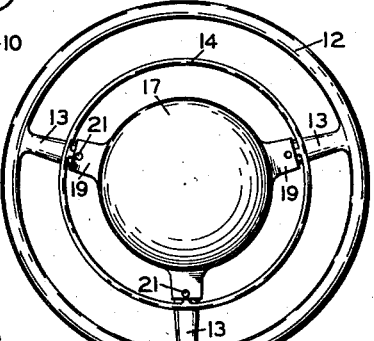
INVENTOR.
AMER L. HOUGHTALING
BY
Kimmel & Crowell
ATTORNEYS

United States Patent Office 2,866,357
Patented Dec. 30, 1958

2,866,357

SAFETY GUARDS FOR STEERING WHEELS IN MOTOR VEHICLES

Amer L. Houghtaling, Cottage Grove, Oreg.

Application December 28, 1955, Serial No. 555,812

4 Claims. (Cl. 74—552)

This invention relates to safety guards for steering wheels in motor vehicles.

A primary object of the invention is to protect the operator of the vehicle when thrown forward against the steering wheel in the event of a collision.

The instant invention contemplates a safety guard of the type including a shock absorber having a resilient feature incorporated in the basic frame of the device which can be a spring material that is covered with a soft pad material, such as sponge rubber or the like. The main shock being absorbed by the spring material from which the frame of the device is made.

Another object of the invention is to provide a shock absorber to be applied to the upper end of the post of the steering column that is simple and easy to install.

Other objects and advantages of the invention will become apparent in the following specification when considered in the light of the attached drawing, in which:

Figure 1 is a front elevation of the invention shown on the steering wheel and column of a conventional vehicle, illustrating the mounting thereof, partially broken away.

Figure 2 is an enlarged horizontal cross-section taken on the line 2—2 of Figure 1, looking in the direction of the arrows.

Figure 3 is an enlarged transverse cross-section taken on the line 3—3 of Figure 1, looking in the direction of the arrows.

Figure 4 is a front elevation of a modified construction illustrating how the device is mounted to a three-spoke wheel.

Figure 5 is a front elevation of the invention mounted on an off-center two-spoke wheel.

Figure 6 is a plan view of the shock absorber, partially broken away, of the frame construction.

Figure 7 is a rear elevation of another modified form of frame construction.

Figure 8 is a view similar to Figure 3, showing a modified clamp for attachment to another type of steering wheel design.

Referring now to the drawing in detail wherein like reference numerals indicate like parts throughout the several figures, the reference numeral 10 indicates a steering column of a conventional motor vehicle. A steering wheel hub 11 is mounted on the upper end of the column 10 and has a steering wheel 12 secured thereto by spokes 13. The spokes 13 may be of any design, as for instance that shown in Figure 1, or Figures 4, 5 and 8. Most steering wheels 12 have a horn operating ring 14 mounted to the hubs 11 thereof by a plurality of outwardly extending spokes 15. The spokes 15 may lie above the wheel spokes 13, as shown in the drawing, or they may be recessed within the spokes 13 as illustrated in Figure 8.

The improved shock absorber attachment for steering wheels 12 consists of a flat or domed frame member 16 embedded within a body 17 of a resilient material, such as sponge rubber. The body 17 is molded about the frame member 16 and extends through openings 18 in the member 16 through which the rubber body 17 may be molded to itself, as well as being molded to the surface of the member 16.

Referring to Figure 6, it will be noted that the frame member 16 has spokes 19 forming part thereof which extend beyond the body 17, the spokes 19 are separated at 19A from the frame member 16, giving a resilient action throughout the entire width of the frame member 16.

In order to apply the same to diametrically opposed steering wheel spokes 13, as illustrated in Figure 1, or to spokes 13 as illustrated in Figures 4 and 5, which are not diametrically opposed to each other, a clip 20 is attached to the outer ends and underneath the extension 19 by any suitable pivot means, as for instance the rivet 21. This permits the clip 20 to align itself with the spoke 13 of the wheel 12 for supporting the shock absorber on the spokes 13 of most any design.

In Figure 3, the clip 20 consists of bifurcated ends 22 which are adapted to embrace the spokes 13 in such manner as to hold the spokes 19 of the shock absorber unit above the horn operating ring 14 and its spokes 15. The spoke 19 is shown as being spaced substantially above the ring 14, but could be positioned just above the horn operating ring 14, however, it must not bear against the horn ring 14 with any pressure. The only time the spokes 19 of the shock absorber would come against the horn ring 14 would be in an accident when the operator was forced against the shock absorber, at which time the spokes 19 would compress the ring 14 down against the spokes 13 of the wheel 12 resisting the forward force of the operator.

In the design of mounting shown in Figure 8, it will be noted that the spoke 19 of the shock absorber rests directly on the spoke 13 of the wheel 12, which would be the most desirable design, as it would take immediate effect when the weight of the operator of the vehicle would come in contact with the same.

The design shown in Figure 7 merely shows a spring 23, adapted to rest on the spokes 13 of the wheel 12 and in this design a rigid body portion 24 is secured to the spring 23. The resilient body 17 is mounted on the body portion 24.

In operation, this new and improved shock absorber rests in the position shown in the drawing until the body of the operator is thrown against the same. When this happens the resilient spokes 19 of the design shown in Figure 6, and the spring 23 in the design shown in Figure 7, absorbs considerable of this forward pressure of the operator towards the steering column 10. It will force the outer ends of the spokes or spring 23 down against the spoke 13 of the steering wheel 12 arresting the forward movement of the operator. Further, the spring 23 or soft body 17 will absorb considerable of this shock against the upper end 11 of the steering column.

Having thus described the preferred embodiments of the invention, it should be understood that numerous other modifications and structural adaptations may be resorted to without departing from the scope of the appended claims.

What is claimed is:

1. A safety guard for steering wheels comprising a resilient perforate frame, a pair of generally U-shaped clips pivotally secured to said frame for attachment to spokes of varying angular relation, and a resilient molded body member cast on said frame with portions thereof extending through the perforations in said frame.

2. A safety guard for steering wheels comprising a resilient perforate frame member provided with a pair of outwardly extending spokes, angularly adjustable spring clips secured to the outer ends of said spokes to provide the means for securing said frame to a steering wheel, and a resilient molded body member cast on said frame member with portions thereof extending through the perforations in said frame member.

3. A safety guard for steering wheels comprising a resilient metallic frame member provided with a pair of outwardly extending spokes, angularly adjustable spring clips secured to the outer ends of said spokes to provide the means for securing said frame to a steering wheel and a resilient molded body member cast on said frame member.

4. A safety guard for steering wheels comprising a resilient perforate frame member provided with a plurality of outwardly extending spokes, spring clips secured to the outer ends of said spokes to provide the means for securing said frame to a steering wheel, and a resilient molded body member cast on said frame member with portions thereof extending through the perforations in said frame member.

References Cited in the file of this patent

UNITED STATES PATENTS

| | | |
|---|---|---|
| 1,225,622 | Hall | May 8, 1917 |
| 1,647,903 | Cook | Nov. 1, 1927 |
| 1,847,758 | Geyer | Mar. 1, 1932 |
| 2,175,206 | Lyon | Oct. 10, 1939 |
| 2,563,339 | Kellogg | Aug. 7, 1951 |
| 2,784,006 | Dye et al. | Mar. 5, 1957 |